United States Patent
Son et al.

(10) Patent No.: US 7,889,998 B2
(45) Date of Patent: Feb. 15, 2011

(54) OPTICAL RECEIVER FOR VISIBLE LIGHT COMMUNICATION AND LIGHT COMMUNICATION SYSTEM USING THE SAME

(75) Inventors: Jae-Seung Son, Suwon-si (KR); Eun-Tae Won, Seoul (KR); Jong-Hoon Ann, Suwon-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 645 days.

(21) Appl. No.: 11/974,376

(22) Filed: Oct. 12, 2007

(65) Prior Publication Data

US 2008/0175603 A1   Jul. 24, 2008

(30) Foreign Application Priority Data

Nov. 22, 2006   (KR) .................. 10-2006-0115675

(51) Int. Cl.
 *H04B 10/00* (2006.01)
(52) U.S. Cl. ..................................... 398/172; 398/120
(58) Field of Classification Search ............ 398/202, 398/212
See application file for complete search history.

(56) References Cited

U.S. PATENT DOCUMENTS

2004/0218187 A1 * 11/2004 Cole ...................... 356/454

FOREIGN PATENT DOCUMENTS

KR   2005-71617   7/2005

* cited by examiner

*Primary Examiner*—Shi K Li
(74) *Attorney, Agent, or Firm*—Cha & Reiter, LLC

(57) ABSTRACT

An optical receiver for visible light communication includes a lens system for converging visible light for light communication and an optical filter for passing converged visible light to the optical receiver. A photoelectric transmission device detects data from visible light for light communication in a VLC system. An optical filter is positioned between the lens system and the photoelectric transmission device, the optical filter having a first film for transmitting visible light and a second film arranged/grown around the first film to transmit ultraviolet rays or infrared rays. A first optical detects data from visible light passing through the first film of the optical filter. A second optical detector detects the intensity of light transmitting the second film. The encoding, encoding rate or intensity of the optical transmitted signal can be adjusted in response to the detection of at least the second optical detector.

17 Claims, 2 Drawing Sheets

OPTICAL RECEIVER FOR VISIBLE LIGHT COMMUNICATION AND LIGHT COMMUNICATION SYSTEM USING THE SAME

CLAIM OF PRIORITY

This application claims priority from application entitled "Optical Receiver for Visible Light Communication and Light Communication System Using the Same," filed with the Korean Intellectual Property Office on Nov. 22, 2006 and assigned Serial No. 2006-115675, the contents of which are incorporated herein by reference in its entirety.

BACKGROUND OF THE INVENTION

1. Field of the Invention

The present invention relates to light communication. More particularly, the present invention relates to an optical receiver for wireless light communication using light in the visible wavelength band.

2. Description of the Related Art

Conventional wireless light communication systems employ infrared wavelengths (i.e. IR communication systems), and their development has reached the level of Fast Infrared (FIR), with capacities of about 4 Mb/s (or more). Typical IR communication systems are commonly used purposes such as device control, as in the case of TV remote controls.

However, conventional IR communication systems have a problem in that the emission characteristics of IR rays require aiming the communication path of the devices for efficient communication, and that the invisibility of emitted light makes it difficult to determine the accuracy of the aim and perform any immediate reaction to adjust the position of a device.

In addition to IR communication, a visible light communication (VLC) system utilizing a white LED has recently been proposed, the installation and construction of which are disclosed in detail in Korean Laid-open Patent No. 10-2005-71617. The optical receiver of the proposed visible light communication system includes a lens, an optical filter, and a photoelectric transformation device (e.g. an optical detector or a phototransistor). The optical receiver detects data from light in the visible wavelength band, which has been applied to the system.

However, conventional optical receivers used for visible light communication systems have a problem in that because they employ visible light for communication, the wavelength band of which overlaps and has interference problems with many of the wavelength bands of light commonly encountered in daily life. In particular, such optical receivers in a VLC system are heavily affected by sunlight.

In other words, in a conventional VLC system, when the optical receivers receive light in the overlapping wavelength bands, which are not employed by their communication systems, erroneous operation or inaccurate data detection may occur. Furthermore, VLC communication systems may have to be used in a limited manner depending on the lighting of the environment.

SUMMARY OF THE INVENTION

Accordingly, the present invention has been made in part to solve at least some of the above-mentioned problems occurring in the prior art. Therefore, one of the many aspects of the present invention is to provide an optical receiver for a visible light communication (VLC) system, which can minimize restrictions on use due to environmental conditions, as well as the occurrence of erroneous operations.

In order to accomplish the aforementioned exemplary aspect of the present invention, there is provided an optical receiver for visible light communication, including an optical filter having a first film for passing visible light for light communication, and a second film grown around the first film to transmit infrared rays or ultraviolet rays; a first optical detector for receiving and detecting visible light passing through the first film; and a second optical detector for receiving and detecting an intensity of light passing through the second film.

According to another exemplary aspect of the present invention, there is provided a communication system including an optical transmitter for creating visible light for light communication; and an optical receiver including an optical filter having first and second films, a first optical detector for receiving visible light passing through the first film, a second optical detector for detecting an intensity of light passing through the second film, and a control unit for creating a control signal to control intensity of visible light, encoding, encoding rate created by the optical transmitter according to intensity of light detected by the second optical detector.

BRIEF DESCRIPTION OF THE DRAWINGS

The above and other exemplary features, aspects, and advantages of the present invention will be more apparent from the following detailed description taken in conjunction with the accompanying drawings, in which.

DETAILED DESCRIPTION OF THE INVENTION

Hereinafter, exemplary embodiments of the present invention will be described in detail with reference to the accompanying drawings. The drawings are provided for illustrative purposes and a person of ordinary skill in the art understands and appreciates that the present invention is not limited to the drawings and descriptions herein. In the following description of the present invention, a detailed description of known functions and configurations incorporated herein is omitted to avoid obscuring the subject matter of the present invention with unnecessary description of such known functions and configurations.

Figure 1:
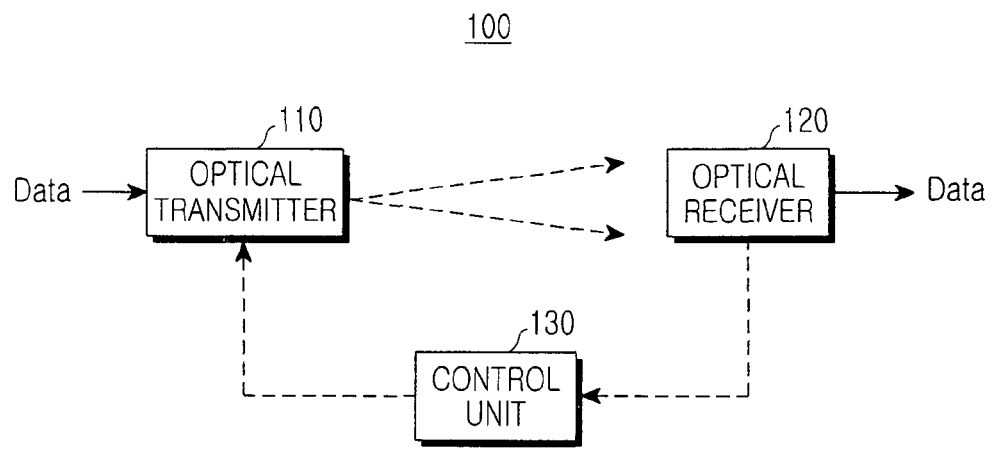
FIG. 1 shows a brief construction of a visible light communication system according to a preferred exemplary embodiment of the present invention.
Figure 2:
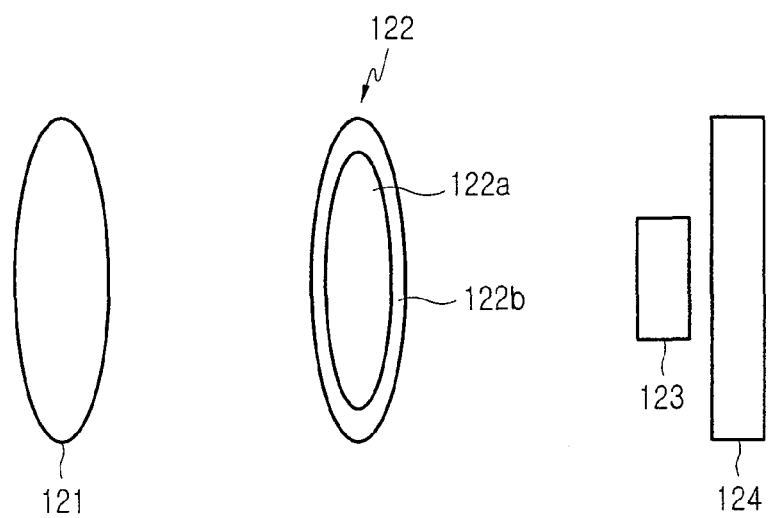
FIG. 2 is a block diagram showing the brief construction of an exemplary optical receiver according to the system shown in FIG. 1.

FIG. 1 shows a brief overview of the construction of a visible light communication system according to a first exemplary embodiment of the present invention, and FIG. 2 is a block diagram showing the brief construction of an optical receiver 120 shown in FIG. 1. Referring to FIG. 1, the visible light communication system 100 according to the present exemplary embodiment includes an optical transmitter 110 for creating visible light for light communication, and an optical receiver 120 for receiving the visible light from the optical transmitter 110.

The optical transmitter 110 creates visible light for light communication, which may include data inputted from an external device, and an LED can be used as the optical transmitter 110.

With reference to FIG. 2, the optical receiver 120 detects data from received visible light for light communication, which has been transmitted by the optical transmitter 110, and detects an intensity of light in wavelength bands other than that of visible light (i.e. ultraviolet rays or infrared rays). Based on the result of the detection, the optical transmitter 110 transmits a control signal to control unit 130 for controlling at least one of the intensity, encoding, encoding rate, etc. of the visible light. The control unit 130 controls the output of optical transmitter 110 to the optical receiver 120.

The optical receiver 120 includes an optical filter 122, a first optical detector 123, a second optical detector 124, and a lens system 121. The control unit 130 can be arranged with the optical receiver 120, the optical transmitter 110, or be provided separately. In any event, the control unit must be able to communication with both the optical receiver 120 and the optical transmitter 110.

Still referring to FIG. 2, the optical filter 122 includes a first film 122a for transmitting visible light for light communication and a second film. 122b grown around the first film 122a to transmit ultraviolet rays or infrared rays. The optical filter 122 may have any necessary shape, including but not limited to a circle, a square, an oval, spherical, etc. The second film. can be grown around a perimeter, circumference, etc., of the lens system 121. The first optical detector 123 receives visible light that has passed through the first film 122a and converts the received visible light into an electrical signal. The second optical detector 124 detects the intensity of light in the ultraviolet or infrared wavelength band, which. has passed through the second film 122b. The first and second optical detectors 123 and 124 may consist of photodiodes, for example, which can detect light in the corresponding wavelength bands, respectively. It is to be understood that the present invention is not limited to optical detectors using photodiodes.

Referring again to FIG. 1, the control unit 130 contains preset data regarding the amount of ultraviolet or infrared rays for each environment in which it is used (indoor/outdoor, amount of sunlight, artificial/natural light) as a reference value. The control unit 130 compares the intensity of ultraviolet or infrared rays, which has been detected by the second optical detector, with the reference value and obtains information regarding the environment in which the optical receiver 120 is being used. Based on the information regarding the environment in which the optical receiver 120 is used, the control unit 130 creates a control signal for controlling the intensity, encoding, encoding rate of visible light created by the optical transmitter 110, and transmits the signal to the optical transmitter 110.

Figure 3:
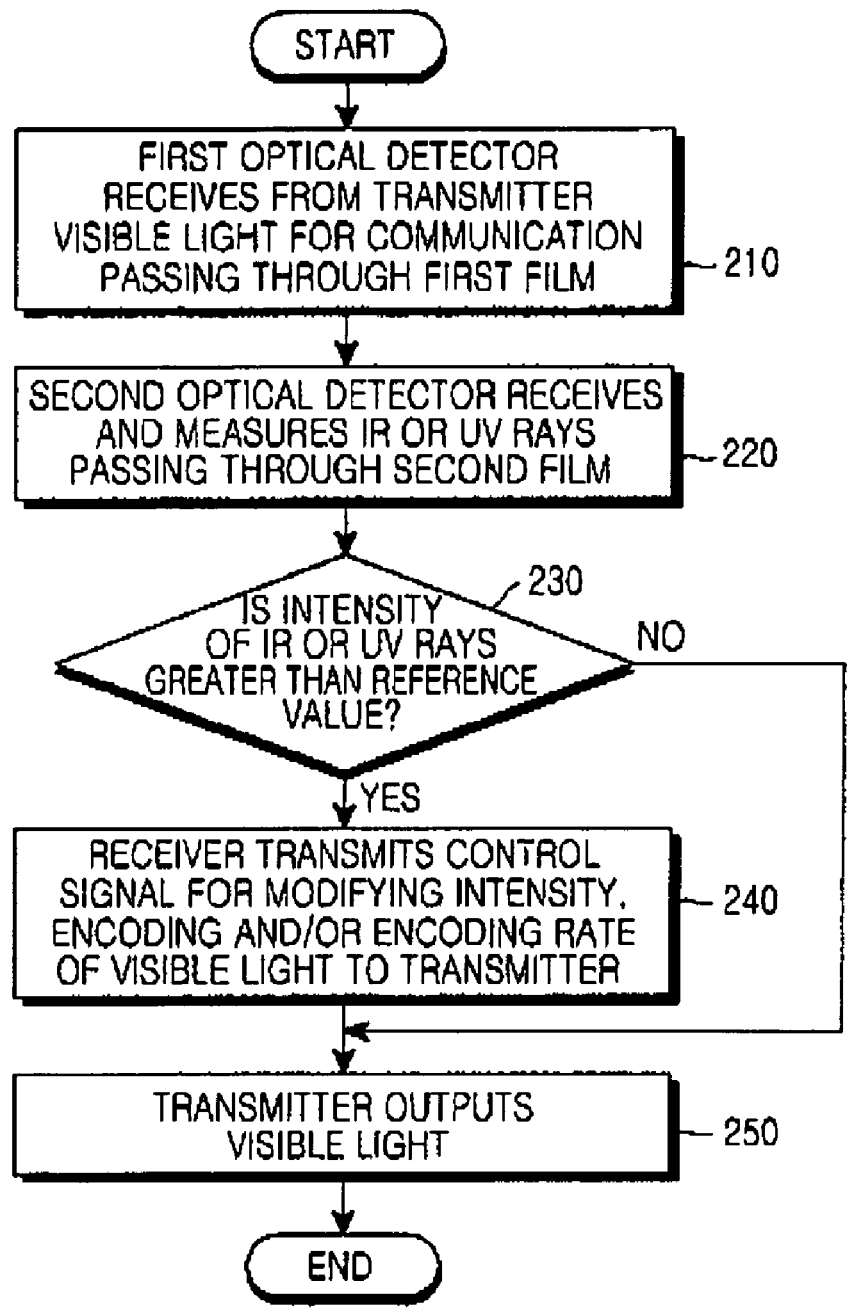
FIG. 3 is a flowchart illustrating the procedural steps for performing visible light communications as in the exemplary system shown in FIG. 1.

Moreover, according to the present invention, the visible light communication system 100 is configured to control the wavelength, encoding, encoding rate, etc. of visible light through the operational steps shown in FIG. 3. A person of ordinary skill in the art understands and appreciates that the exemplary method steps in FIG. 3 is not the only way the present invention can be practiced.

Referring to FIG. 3, the exemplary method steps for performing visible light communication system 100 according to the present invention includes the step of: receiving (s210) visible light by optical receiver 120, measuring (s220) infrared rays or ultraviolet rays, comparing (s230) the intensity of measured infrared rays or ultraviolet rays with previously inputted data, modifying (s240) the encoding and encoding rate of visible light created by the optical transmitter 110, and creating (s250) visible light.

During the step (s230) of comparing the intensity of measured infrared rays or ultraviolet rays with previously inputted reference data value, if neither infrared rays nor ultraviolet rays are detected, or if the intensity of measured infrared rays or ultraviolet rays is below a respective reference value (Y) (not shown), visible light is created for transmission by the optical transmitter without modifying the encoding and encoding rate of visible light. In contrast, if the intensity of measured infrared rays or ultraviolet rays is above the reference value (Y), the optical transmitter 110 goes through the step (240) of modifying at least one of the intensity, encoding and encoding rate of visible light. Note that the response of photodiode depends on the type of semiconductor used and temperature of the photodiode.

Still referring to FIG. 2, the lens system 121 faces toward the optical transmitter 110 (shown in FIG. I) and converges visible light for light communication toward the optical filter 122, which has been transmitted by the optical transmitter 110 and received by the first and second optical detectors, so that visible light is detected by first optical detector 123, and infrared rays or ultraviolet rays, which come in from outside, are detected by the second optical detector 124.

As mentioned above, the inventive optical receiver and light communication system using the same are advantageous in that, by determining whether or not ultraviolet or infrared rays exist and comparing the amount of detected ultraviolet or infrared rays with a reference value, the characteristics of visible light are adjusted according to the environment in which the optical receiver is employed. Use of such visible light for communication according to the present invention guarantees stable operation characteristics heretofore unknown in conventional VLC systems.

While the invention has been shown and described with reference to certain exemplary embodiments thereof, it will be understood by those skilled in the art that various changes in form and details may be made therein without departing from the spirit and scope of the invention as defined by the appended claims. For example, not only can the intensity of visible light transmitted for VLC be controlled according to the detected intensity of UV rays or infrared rays, but the type of encoding used, or the encoding rate used, may be controlled according to the received intensity of the UV or infrared rays.

What is claimed is:

1. An optical receiver for visible light communication, comprising:
    an optical filter having a first film for passing visible light including light output by a transmitter for visible light communication (VLC), and a second film arranged around the first film for passing infrared light or ultraviolet light;
    a first optical detector for detecting visible light including the light output by the VLC transmitter passing through the first film of the optical filter for VLC; and
    a second optical detector for detecting an intensity of infrared or ultraviolet light passing through the second film,
    wherein at least said second optical detector provides an output value of the detected intensity of infrared or ultraviolet light for adjusting the transmission of visible light output by the VLC transmitter.

2. The optical receiver according to claim 1, wherein the second film is grown around the first film.

3. The optical receiver according to claim 1, wherein the second film is arranged around one of a perimeter or a circumference of the first film.

4. The optical receiver according to claim 2, wherein the second film is grown around one of a perimeter or, a circumference of the first film.

5. The optical receiver according to claim 2, further comprising a lens system for converging light toward the optical filter, the light including visible light from the VLC transmitter, and ambient light-having infrared light or ultraviolet light.

6. The optical receiver according to claim 1, further comprising a control unit for creating a control signal output to the VLC transmitter to control an intensity, encoding, or encoding rate of the visible light according to the output value of the intensity of infrared light or the ultraviolet light detected by the second optical detector and output to the control unit.

7. The optical receiver according to claim 6, wherein the control unit creates a control signal to control the intensity encoding or encoding rate of visible light output by the VLC transmitter by comparing the intensity of the infrared light or the ultraviolet light detected by the second optical detected with a reference value.

8. The optical receiver according to claim 7, wherein the reference value comprises respective reference values for the intensity of ultraviolet light and the intensity of infrared light.

9. The optical receiver according to claim 1, wherein the first optical detector comprises a photodiode for detecting light in a visible wavelength band.

10. The optical receiver according to claim 1, wherein the second optical detector comprises a photodiode for detecting at least one of ultraviolet light or infrared light.

11. A communication system comprising:
an optical transmitter for creating visible light for visible light communication (VLC transmitter); and
an optical receiver comprising an optical filter having first and second films,
a first optical detector for detecting visible light including light output by the VLC transmitter that passes through the first film for VLC,
a second optical detector for detecting an intensity of light passing through the second film, and a control unit for creating a control signal output to the VLC transmitter for controlling an intensity, encoding or encoding rate of visible light output by the VLC transmitter according to the intensity of light passing through the second film and detected by the second optical detector.

12. The communication system according to claim 11, wherein the optical receiver further comprises a lens system facing toward the VLC transmitter for converging light toward the optical filter, the light including visible light form the VLC transmitter and ambient light having infrared light or ultraviolet light. said lens system converging visible light for VLC to the first optical detector and ultraviolet light or infrared light toward the second optical detector.

13. The communication system according to claim 11, wherein the first optical detector comprises a photodiode for converting visible light received through the optical filter into an electrical signal.

14. The communication system according to claim 11, wherein the second optical detector comprises a photodiode for detecting an intensity of ultraviolet light or infrared light.

15. The communication system according to claim 11, wherein the VLC transmitter comprises an LED for creating visible light for VLC, wherein an intensity of the visible light having been controlled according to the control signal output from the control unit.

16. The communication system according to claim 11, wherein the VLC transmitter comprises an LED for creating visible light for VLC, wherein an encoding of the visible light having been controlled according to the control signal output from the control unit.

17. The communication system according to claim 11, wherein the VLC transmitter comprises an LED for creating visible light for VLC, and wherein an encoding rate of the visible light having been controlled according to the control signal output from the control unit.

* * * * *

UNITED STATES PATENT AND TRADEMARK OFFICE
CERTIFICATE OF CORRECTION

| | | |
|---|---|---|
| PATENT NO. | : 7,889,998 B2 | Page 1 of 1 |
| APPLICATION NO. | : 11/974376 | |
| DATED | : February 15, 2011 | |
| INVENTOR(S) | : Jae-Seung Son et al. | |

It is certified that error appears in the above-identified patent and that said Letters Patent is hereby corrected as shown below:

Column 6, Claim 12, Line 10, should read as follows:
--...ultraviolet light, said lens...--

--There should be a "," after the word light, not a ".".--

Signed and Sealed this
Tenth Day of May, 2011

David J. Kappos
*Director of the United States Patent and Trademark Office*